INVENTOR
PHILIP H. HOWARD

BY K. P. Johnson
ATTORNEY 3,267,430

CHARACTER RECOGNITION EMPLOYING OFFSET REGISTRATION CONTROL MASKS

Philip H. Howard, Rochester, Minn., assignor to International Business Machines Corporation, New York, N.Y., a corporation of New York Filed July 2, 1962, Ser. No. 206,636
13 Claims. (Cl. 340—146.3)

This invention relates generally to apparatus for identifying a recorded indicium belonging to a limited group of indicia, and more particularly to apparatus for determining the identity of such indicium by simultaneously comparing its image with the images of each of the indicia composing the group.

Machine recognition of unknown recorded indicia by mask matching is one of several systems employed for identification. The mask matching technique is particularly desirable because of the relatively simple and inexpensive apparatus required. In this system an image of the unknown recorded indicium is superimposed on an image mask of each of the indicia in the group. Each image mask is formed of opaque and transparent areas identical in size of the indicium image and background projected thereon. Behind each mask is positioned a photo-responsive device which converts into electrical analog signals the quantity of light passing beyond the mask due to the projected image and background. The analog signals provide a machine readable indication of the degree of coincidence between an image and each mask. Subsequent comparison of the signals will determine the mask with which the image most closely coincides and an appropriate indicator may be actuated to identify the unknown image.

The type of masks used is subject to choice and may be either positive or negative, and either entire or segmental. Generally a stationary unknown image is projected onto a rotating mask member such as a disc or belt on which the individual masks are formed. The composite mask member includes an entire image mask of each indicium in the group or a series of segmental masks of characteristic elements of the indicia in the group, e.g., alphabetic or numeric characters. A variation of this mode is to simultaneously project successive image segments onto all masks. Identification is accomplished with either type of mask by summing the successive output signals from individual masks and then appropriately using the largest or smallest sum to identify the particular mask or indicium.

The mask matching technique is, however, subject to limitations which have prevented its adaptation to high speed recognition systems. A particularly difficult problem is that of accurate registration of the projected image onto its corresponding mask to be assured that the machine can correctly identify the image. The registration difficulty arises with the inaccurate positioning of the recorded indicium within the limited field of view of the optical apparatus which produces and projects the images. Misregistration may result from either or both misalignment of the recorded indicium relative to adjacently recorded indicia, usually due to the tolerance of a printing member, or misalignment of the record as it is moved into the optical scanning area. The correction of indicia and record misalignment imposes burdensome and costly tolerances on printing and record transport mechanisms. Therefore, it is desirable that the optical apparatus be able to compensate for defective alignment. A partial solution is the use of oscillating reflecting surfaces designed to move the projected image in two coordinate directions across the mask during recognition so that optimum registration will occur but at some unknown time. Such oscillatory motion must be carefully limited so that erroneous identity does not occur. This solution, however, raises a timing problem of when to test for coincidence between mask and image and, for this, no satisfactory solution has been proposed. This timing problem is particularly troublesome when a record member is continuously moved through the viewing field because no incremental movement occurs with which to synchronize mask sampling by the photoresponsive devices. When an attempt is made to utilize, for example, the leading edge of a record, some of the recorded indicia thereon in a line of printing may be sufficiently misaligned along the direction of motion so that a particular indicium is partially outside the viewing field.

Another limitation of the mask matching technique is the recognition time necessary for each indicium to be identified. The projection of an image onto successive masks in a serial mode or the serial projection of successive image segments onto masks in a parallel mode inherently require additional time for the serial portion of the matching operation. It is thus evident that an entirely parallel matching technique would permit a substantial decrease in the time required to recognize each indicium.

Accordingly, it is a primary object of this invention to provide an improved recognition apparatus for identifying recorded indicia with the mask matching technique which results in more accurate recognition at increased speeds.

Another object of this invention is to provide recognition apparatus for identifying recorded indicia in which entire images of an unknown indicium are simultaneously matched with a plurality of individual masks.

Another object of this invention is to provide apparatus for producing simultaneously multiple entire images of an unknown recorded indicium.

Another object of this invention is to provide recognition apparatus for identifying recorded indicia which is substantially unaffected by the usual misalignment of either the recorded indicia or record.

Yet another object of this invention is to provide apparatus for moving the plurality of images of a recorded indicium in unison across a corresponding plurality of image masks in two coordinate directions.

Still another object of this invention is to provide a recognition machine for recorded indicia using the mask matching technique and having apparatus therein for timing identification to occur at optimum registration between the masks and the projected images thereon.

Still another object of this invention is to provide a recognition machine for a recorded indicia using the mask matching technique and having a mask member with both image and registration masks therein.

A still further object of this invention is to provide a recognition machine for a recorded indicia in which multiple images of an unknown indicium are projected simultaneously onto a plurality of different image masks and parallel comparison of the mask image match occurs to determine the mask most closely coinciding with the image thereon.

Yet another object of this invention is to provide a novel circuit for a recognition machine which permits simultaneous parallel comparison of a plurality of signals from image and mask combinations and indicates the combination most closely coincident.

Still another object of this invention is to provide a recognition machine for unknown recorded indicia which is of relatively simple and inexpensive construction.

Still another object of this invention is to provide novel registration masks by which identification of an indicium is controlled.

In accordance with the foregoing objects, this invention provides a mask member having thereon a unique image mask of each of the indicia in a predetermined group and a pair of registration masks disposed in opposite directions from alignment relative to the image masks. Means are provided to produce multiple images of the recorded indicium and include a scanning means to continuously scan across a recorded indicium normal to the direction of movement of a record as it moves through a viewing area. The image multiplying means simultaneously projects a multiplicity of images of the unknown recorded indicium onto the image masks of the mask member as the recorded indicium becomes fully exposed to the scanning means. The scanning means causes each projected image to sweep across a different one of the image and registration masks in unison so that a projected image comes first into full registration with a registration mask and then a plurality of images follow into full registration with all of the image masks and still later an image will fall into full registration with a second registration mask.

Identification means, having a plurality of indicator devices each corresponding to one of the image masks, is associated with all image masks and utilizes means to compare the degrees of coincidence between the masks and images thereon and activate the particular indicator device representative of the image mask most closely coinciding with the projected image. However, registration means including the registration masks in the mask member provide an overriding control to make the comparing means ineffective at any time the projected images are more closely aligned with a registration mask than with the image masks. Since the registration masks are displaced in opposite directions from the aligned image masks, the comparing means is released from overriding control at the time of optimum registration between the moving images and the image masks.

By producing multiple entire images and providing a separate optical channel for each image, parallel image comparison is advantageously attained with the result of more efficient use of recognition time. The parallel identification concept is carried further into the comparing means where comparison simultaneously occurs with the superimposition of images thereby eliminating the requirement of storage elements as is often used. The identification means also has the feature that it may be varied to respond only to degrees of coincidence above preselected values.

The foregoing and other objects, features and advantages of the invention will be apparent from the following more particular description of the preferred embodiment of the invention as illustrated in the accompanying drawings.

In the drawings:

FIGURE 1 is a perspective schematic view of the image projection apparatus of the invention;

FIGURES 2*a*, 2*b* and 2*c* are partial views of the image and registration masks as used in the invention and show the progressive movement of images projected thereon;

Figures 1, 2A:
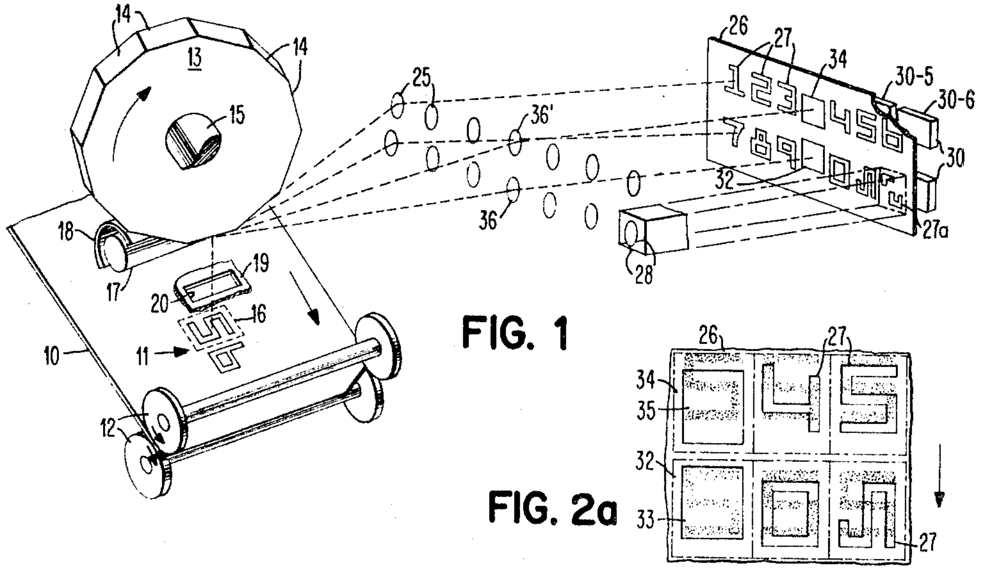

Referring to FIG. 1, a record 10 having a line of printed indicia 11 thereon is moved along a designated path by any suitable means such as feed rolls 12. Adjacent the line of indicia is a scanning mirror 13 having a plurality of peripheral plane reflective surfaces 14 of equal dimensions. Scanning mirror 13 is secured to a shaft 15 which rotates on an axis parallel to the direction of record movement to thus scan the indicia in a vertical direction. The mirror shaft and feed rolls are driven by any conventional power source such that a portion of the record equivalent to a character space 16, indicated in broken lines, is vertically scanned by a reflecting surface 14 approximately 20–30 times as that portion of the record moves completely through the scanning area. The scanned area is illuminated by a suitable light source 17 such as an elongated tungsten filament lamp aligned parallel to the vertical scan path. A reflector 18 is provided to direct the light to the record surface. A nonreflective opaque shield 19 having an aperture 20 therein is suitably positioned to limit the character area reflected by surfaces 14.

Adjacent the scanning mirror, to the right in the figure, are located a plurality of lenses 25 and a mask member 26 formed with a plurality of individual image masks 27, each corresponding to one of the lenses. The lenses are suitably mounted in a support member (not shown) and aligned so that each is adapted to simultaneously receive the reflected indicium image and its proximate background area reflected by an individual reflecting surface 14. Although the images may be enlarged or decreased each lens is preferably so located and of such size as to project onto its corresponding image mask 27 an image approximately equal in size to the object indicium. There is thus provided apparatus to simultaneously produce a plurality of images of a recorded indicium.

An image mask is provided on mask member 26 for each indicium included in the group of indicia to be encountered during recognition, e.g., the characters 0–9 and two special characters, as shown, or alphabetic characters. The individual image masks are preferably formed by successive exposure of the different indicia on a selectively exposed sensitized photographic film through the same optical system in which the masks are to be later used for identification, thereby insuring that any distortion in the optical system is incorporated in the masks. This method of forming the masks also compensates for minor misalignment of the lenses. The background area of each image mask is opaque and each character area is transparent in the unique configuration and size of the character image. Each image mask and its corresponding lens 25 is isolated from all others by a honeycomb arrangement of horizontal and vertical plates such as the plates 28 partially shown for special character mask **27*a***. The image channels so formed are preferably light absorbing or roughened on the interior to avoid multiple reflection from the interior channel walls.

Figure 2B:
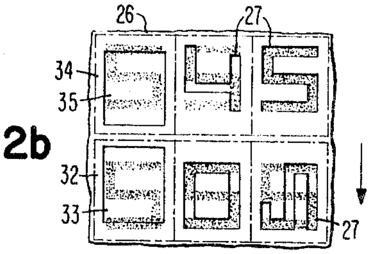
Figure 2C:
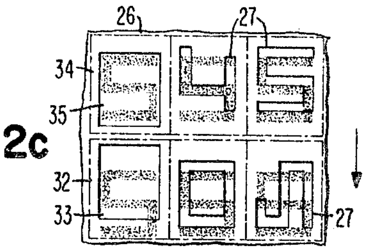

It is seen thus far that as mirror 13 rotates while record 10 is moved along its predetermined path, character area 16 will move in the direction of the arrow through the viewing area scanned by each reflecting surface 14. It is obvious that until an indicium such as the exemplary character 5 achieves full entry into viewing area 16 that portions of both the exemplary character 9 and character 5 will appear on each image mask 27 through lenses 25. However, as the character 5 moves into full registration with the scanning area, its entire image will be reflected into each lens 25 and, as a particular reflecting surface 14 continues to move in the clockwise direction, an image of the 5 will move downwardly simultaneously across each image mask 27 through a position of optimum registration with each of the image masks. The length and width of each mirror surface 14 is sufficient to move each indicium image across its image mask, from top to bottom, without having any edge of the mirror intersect any of the hypothetical surfaces formed by joining the peripheral edge of a lens 25 with the edges of the view area 16. The image projection is illustrated in FIGS. 2*a*–2*c* which shows the 5 image superimposed on each of the image masks 27 shown, namely, the characters 4, 5, 0 and a special character. As the images progressively move in the direction of the arrows in FIGS. 2*a*–2*c* they pass through a position of optimum registration with the image masks shown in FIG. 2*b*.

Behind each image mask is located a conventional photo-electric transducer 30 such as a light-sensitive semiconductor (solar cell) as illustrated in FIG. 1. The solar cells illustrated each generate a current when illuminated which produces a voltage signal across a suitable impedance as more fully described hereinafter. Each solar cell, placed immediately adjacent the respective image mask, is sufficiently large to cover all of the transparent area in each mask and produces a signal which has a voltage change directly proportional to the amount of dark image falling thereon. The voltage change of each signal is amplified to yield an output signal for each mask channel. Identification of the unknown projected images is accomplished by comparing the output signals and selecting the largest signal as will be described hereinafter. With the 5 image positioned as shown in FIGS. 2*a* and 2*c*, the cells in back of image masks 27 may produce equal or nearly equal output signals since one or more of the image masks may have the same quantity of transparent image area covered by the projected 5 image. However, at the time of optimum registration as shown in FIG. 2*b*, no image mask 27 is covered with as much of the projected image as the correct 5 image mask. As a result, at optimum registration the solar cell behind the 5 image mask will produce a voltage change signal larger than those of any of the cells behind the remaining image masks. At this time the output signals from all image masks can be compared and the largest signal can be used to identify the projected images of the unknown recorded indicium. However, it is evident that erroneous identification may occur if the various output signals are compared either before or after the time of optimum registration. Therefore, some means must be provided to insure that the comparison of solar cell signals occurs only when the projected images are most closely coincident with the image masks on each sweep of the images over mask member 26.

The time at which the comparison of signals from cells 30 occurs is controlled in part by a pair of substantially transparent registration masks 32 and 34, best illustrated in FIGS. 2*a*–2*c* and 3. These two masks are located as shown in FIG. 1 and receive images of the unknown recorded indicium through respective lenses 36 and 36'. The lenses are aligned similar to the other lenses 25 so that indicium images are projected simultaneously onto image masks 27 and registration masks 32 and 34. The lenses project images horizontally aligned with the images projected through the remaining lenses 25. Mask 32 is a leading or R mask having a substantially transparent area 33 which is displaced upwardly from alignment with the image masks so as to be the first transparent area to encounter and become fully registered with one of the downwardly moving images before optimum registration occurs between the remaining projected images and their corresponding image masks. Mask 34 is a lagging or S mask having a substantially transparent area 35 which is displaced downwardly from alignment with the image masks so that the moving images pass through a position of optimum registration with the image masks before an image becomes fully registered with the lagging mask transparent area 35. The transparent area dimensions of the registration masks are approximately 20 to 25% larger in both width and height than the extreme dimensions of the transparent area of any image mask. Because of this, a projected partial or entire image from the scanning mirror will definitely first appear within a transparent area of a registration mask whether or not such image appears within the transparent area of an image mask. Each registration mask is provided with a solar cell aligned therewith similar to solar cell 30, which responds to produce an output signal in proportion to the quantity of image falling in the transparent region of the R or S masks.

With particular reference to FIGS. 2*a*–2*c*, it will be seen that as a 5 image moves downwardly (FIG. 2*a*) across each of the image masks and registration masks of member 26, the transparent area 33 of leading mask 32 will be the first of all transparent areas to be encroached upon by a moving image or portion thereof and thus its solar cell will produce an output signal larger than that of the solar cells for any of the remaining masks. This output signal will continue to increase until the time the 5 image is entirely registered within area 33. During this image progression no other solar cell is covered with as much image as the cell behind mask 32 and, therefore, all other output signals produced from the remaining solar cells are less than that output signal produced from the cell at mask 32.

In FIG. 2*b*, as the image continues to move downwardly across mask member 26, the image of the 5 begins to move onto the opaque mask area at the bottom of mask 32 thus resulting in a decreasing output signal from its solar cell. However, at this time a 5 image comes into optimum registration with the transparent area of the 5 image mask and remaining image masks 27. Therefore, the 5 solar cell will produce the largest output signal since it is covered with the most image at that instant in time. It is to be remembered that a 5 image is also moving across lagging mask 34, but this mask is displaced downwardly from alignment with the image masks and, therefore, a moving image will not be fully registered with transparent area 35 until the projected images have moved beyond the position of optimum registration with the several image masks to that position as shown in FIG. 2*c*. In the latter figure, the 5 image on each registration and image mask has moved slightly below the transparent areas of the masks with the exception of the transparent area of S mask 34 which is now most favorably registered with its corresponding image. The result of this continued movement is that the solar cell behind mask 34 now produces its maximum output signal because of its full registration and will provide a signal greater than the signals from any other remaining image masks 27 or R mask 32.

Figure 3:
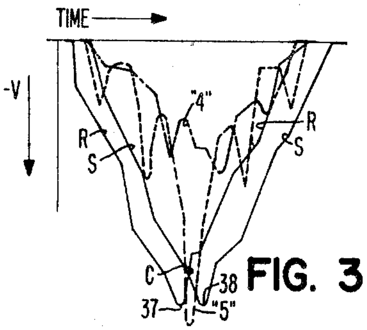
FIGURE 3 is a graphical representation of the voltage signals encountered at the photoelectric transducers of FIG. 1.

The resulting negative output signals produced as a 5 image moves across the R mask, S mask, and the 4 and 5 image masks are illustrated in the voltage-time diagram of FIG. 3. The leading R output signal occurs first in time because the transparent portion of that mask was the first of any of the masks to be covered by a downwardly moving portion of the 5 image. As the projected image continues to move, the next output signals to occur are the 4 and 5 image mask signals, so designated in the figure, which start almost simultaneously. Subsequent to the start of these signals, the S mask begins to produce its output. It is seen from the figure that the R mask output produces a steadily increasing signal until a peak is reached at point 37 which indicates that the 5 image is fully registered within transparent area 33. As the image begins to pass into the opaque area of the R mask, the signal decreases and eventually no output is produced as the 5 image entirely leaves transparent area 33. Similarly, the 4 and 5 image mask signals change erratically as the moving images cross the various transparent areas and approach optimum registration. However, the 4 signal decreases near the point of optimum registration because its crossbar becomes exposed while the 5 signal reaches a peak at that time. Thus, at optimum registration the signal from the R mask has begun to decrease and the signal from the S mask has not yet reached its peak so that the 5 mask signal can be distinguished since it is the largest at the time. Subsequently the S mask reaches a peak at point 38 as the moving image fully enters transparent area 35 of FIG. 2c and provides the largest signal as the image traverses the transparent area. This signal later begins to decrease proportionately as more and more of the moving image passes out of area 35 onto the opaque area of the S mask. Thus, the R and S masks provide timing signals, between which the signals from all image masks may be compared and the largest signal selected as identifying the unknown projected image. It will be noted from the figure, however, that the image mask signal must exceed both the R and S signals at optimum registration time. If the identification signal does not so exceed the registration mask signals, no identification will occur during that particular passage of the multiple images over the image masks. The use of the registration mask signals and the manner of selecting the largest image mask signal will be described hereinafter.

Figure 4:
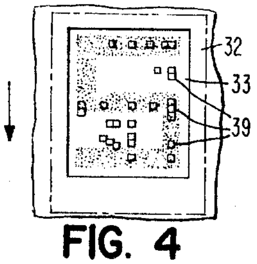
FIGURE 4 is a detailed elevation view of a registration mask shown in FIGS. 1 and 2*a*–2*c*.

Although the signals from registration masks 32 and 34 are less than the output signal of an image mask and a projected image properly registered thereon, this signal difference is extremely small and the time for selecting the proper identification signal is usually extremely short. Therefore, the transparent areas 33 and 35 of the registration masks are each made approximately 95% transparent by the addition of minute opaque areas 39 as shown in FIG. 4 for registration mask 32. In the R mask these areas are concentrated near the lower portion of the transparent areas 34 so that as an image moves downwardly through the area 34 the output from its solar cell will not be substantially diminished until very near the position of optimum registration, just before the image starts to move onto opaque area of the mask. Thus, when an image first enters transparent area 34, moving downwardly, the solar cell will be able to produce a definite overriding signal as compared to the outputs from the solar cells at the image masks. The arrangement of opaque spots 39 is optional, but they are preferably concentrated near the lower center portion of the R mask for maximum coincidence with an image only when the remaining moving images are sufficiently well centered on the image masks 27 so that probably an output signal from the correct image mask will exceed the registration mask outputs. In other words, prior to the time that the projected images are centered on their respective image masks during successive reflections from mirror surfaces 14, partial images of both the entering and exiting indicia, or of only the entering indicium at character area 16 may be projected onto all masks. When partial images are produced or when the entire images are not yet fully centered horizontally on the image masks, the registration masks should produce the largest signal at all times during a scan. Only a minimum of opaque spots 39 should be encountered with each vertical image sweep at this time. As a result, opaque spots 39 are arranged so that the image of any indicium in the group will encounter when projected, a sufficient number of spots to total approximately 5% of its entire image area at the time of optimum horizontal and vertical registration with the image masks to decrease the R mask signal. Similarly, the S mask signal output should be approximately 5% below its maximum value at the time of optimum registration, increasing to its maximum as the image moves downward thereon. Therefore, the opaque spots are provided on its transparent area 35 and are concentrated near the top center area thereof.

A brief summary of the invention described thus far may be presented by considering the operation of the apparatus discussed above. As feed rolls 12 move record member 10 in the direction of the arrow shown in FIG. 1, scanning mirror 13 rotates moving its reflective surfaces 14 successively into position over character area 16. Light from source 17 is directed onto character area 16 and reflected from record 10 to a mirror surface 14 where it is redirected through each lens 25, 36 and 36' into parallel rows to individual image masks 27 and registration masks 32 and 34, respectively, of mask member 26. As record 10 moves, the recorded indicia 11 thereon enter the scanned character area 16 successively and create their partial and eventually entire image, in turn, on moving surfaces 14. This image is reflected into each lens so that an image is simultaneously projected onto each mask in two image rows, each horizontally aligned. As the reflective surface moves, the aligned images move in unison downwardly across their respective unique image masks 27 and registration masks 32 and 34. A photoelectric transducer 30 behind each mask produces a change in voltage which in turn, through the amplifier, produces a negative electrical output signal in proportion to the quantity of dark image falling onto the uniquely positioned transparent area of each mask. There are thus provided a plurality of output signals which may be compared and the largest (most negative) signal selected to indicate a particular mask with which a projected image most closely coincides.

However, leading registration mask 32 is substantially entirely transparent and is displaced upwardly from horizontal alignment with the image mask 27 and is first to encounter a downwardly moving image. Hence, it produces the largest output signal since it will be covered to the greatest extent by any projected partial or entire image. Because of the upward displacement of mask 32, the image will begin to move out of its transparent area before the time the remaining images reach optimum registration with the transparent portions of image masks 27. The signal at mask 32 will then begin to decrease slowly and the largest signal will come from an image mask 27 if one of the projected images coincides with the unique transparent image configuration of a mask. In the event a projected image is only partial or not sufficiently centered on masks 27, no transducer signal will exceed that present from the transducer at the R mask 32.

During the time that the projected images are approaching their best registration with the masks 27, one image is also falling in increasing quantity upon the substantially entirely transparent area 35 of lagging S mask 34. However, at the time of optimum registration between the images and mask 27, the S image is not fully registered on area 35, and no overriding signal is produced therefrom. But as the images move beyond the position of optimum registration the S mask produces the signal of greatest amplitude to override all other signals. Because the transparent area of each registration mask is 20 to 25% larger in both length and width than that of any image mask, all partial images or all portions of two images (as the identified indicium leaves and the succeeding indicium enters character area 16) will fall in the transparent areas of the R and S masks to produce the largest output signal except when the entire image is both horizontally and vertically registered with its appropriate image mask.

From the foregoing, it is evident that the largest signals are produced from the registration masks except during the time when an entire image of an unknown indicium coincides with its image mask, and that these registration signals establish a minimum signal level (illustrated as crossover point $c$) in FIG. 3 which must be exceeded by an output from an image mask 27 before a voltage signal will occur which may be used for recognition.

The manner in which the registration and image mask signals are used for identification of a projected image will now be described with particular reference to FIGS. 5 and 6. The identity of an unknown image is determined with the identification means shown in FIG. 5 which comprises generally photoelectric transducers 30–5, 30–4, 30–3, 30–R and 30–S for the various image and registration channels, individual differential amplifiers 50, 51, 52, 53 and 54 for the signals produced by each transducer, individual transistor switches 60, 61, 62, 63 and 64 for each channel, and individual output indicators 70, 71 and 72 for each image mask channel. The image channels shown have been arbitrarily selected from the twelve image channels of FIG. 1 merely for illustrative purposes. Photoelectric transducers or solar cells 30–3, 30–4 and 30–5 are each located behind the transparent areas of the respective 3, 4 and 5 image masks; solar cells 30–R and 30–S are respectively positioned behind the transparent areas 33 and 35 of registration R and S masks 32 and 34. As the projected images move across the image and registration masks, each cell produces a voltage change across the respective one of variable resistors 40, 41, 42, 43 and 44 in proportion to the quantity of image instantaneously falling on the mask. The variable resistors are adjusted to provide identical amplifier outputs when the same quantity of image falls on its corresponding mask. The adjustment may be accomplished by temporarily substituting identical transparent masks for each of the masks shown in FIG. 1 and projecting the same image onto each mask until the desired outputs are obtained with the mirror rotating at normal speed. The solar cell signals in this embodiment decrease as the quantity of image thereon increases and the outputs are supplied directly to a respective one of amplifiers 50–54 on corresponding lines 45–49.

The amplified output signals on each channel are proportional to the changes in solar cell signals and are supplied as input signals to the base of a respective one of switching transistors 60–64. Each collector electrode of the transistors 60–64 is connected through a load resistor to a source of negative supply potential at the respective terminals 65–69 and the collectors of image channel transistors 60–62 are connected to an input terminal of a corresponding conventional bi-stable trigger circuit 70–72 well-known in the art. The indicators may also be neon circuits, relays, or the like. All collectors of transistors 60–64 are clamped to ground through reverse-biased diodes to limit the collector signals. When switched by an input signal, a trigger operates by its output signal as an indicator to signify that the highest degree of coincidence between a projected image and an image mask occurred on its image channel, and thus will indicate the particular image mask with which the unknown image coincides.

Returning now to transistors 60–64, their emitters are joined by lines 76, 77 and 78 to line 79 which is connected to a source of positive potential at terminal 80 through a common emitter resistor 81. A transistor 82 is connected through its emitter to resistor 81 and through its collector to a source of negative potential at terminal 83; its base is connected to a suitable source of bias potential at terminal 84. The base bias is adjusted to cause the transistor to conduct current through resistor 81 and establish the emitter potential for transistors 60–64. The emitter level so established will determine the minimum base signal necessary to turn on one of the switching transistors. In other words, one of the amplified solar cell outputs from the various image and registration masks which are supplied at the bases of transistors 60–64 will have to be more negative than the emitter level present to switch on its respective transistor.

Also connected to the level-setting transistor 82 by line 79 is a feedback circuit comprising capacitor 85 and attenuating resistor 86, the output of which is supplied on lines 90–94 as a degenerative feedback to each of the respective amplifiers 50–54. This feedback is used to subtract from each amplifier input voltage signal, identical fractions of any voltage change appearing across the capacitor and resistor. The feedback effects a percentage increase in voltage differences between the largest solar cell signal and the outputs from the remaining cells. Negative feedback to the amplifiers is desirable because the difference in signals which must be distinguished is on the order of one microvolt. If no feedback was used, the maximum difference in gain permitted among the amplifiers would be approximately 1%, and the amplifiers would have to deliver output voltages on the order of 50 volts to provide a distinguishable signal. With the feedback circuit as shown, however, the amplifier in the channel having the next to the largest signal can vary up to 20% greater than the amplifier in the channel having the largest signal, and the largest amplifier input signal can still be distinguished at the switching transistors.

Figure 5:
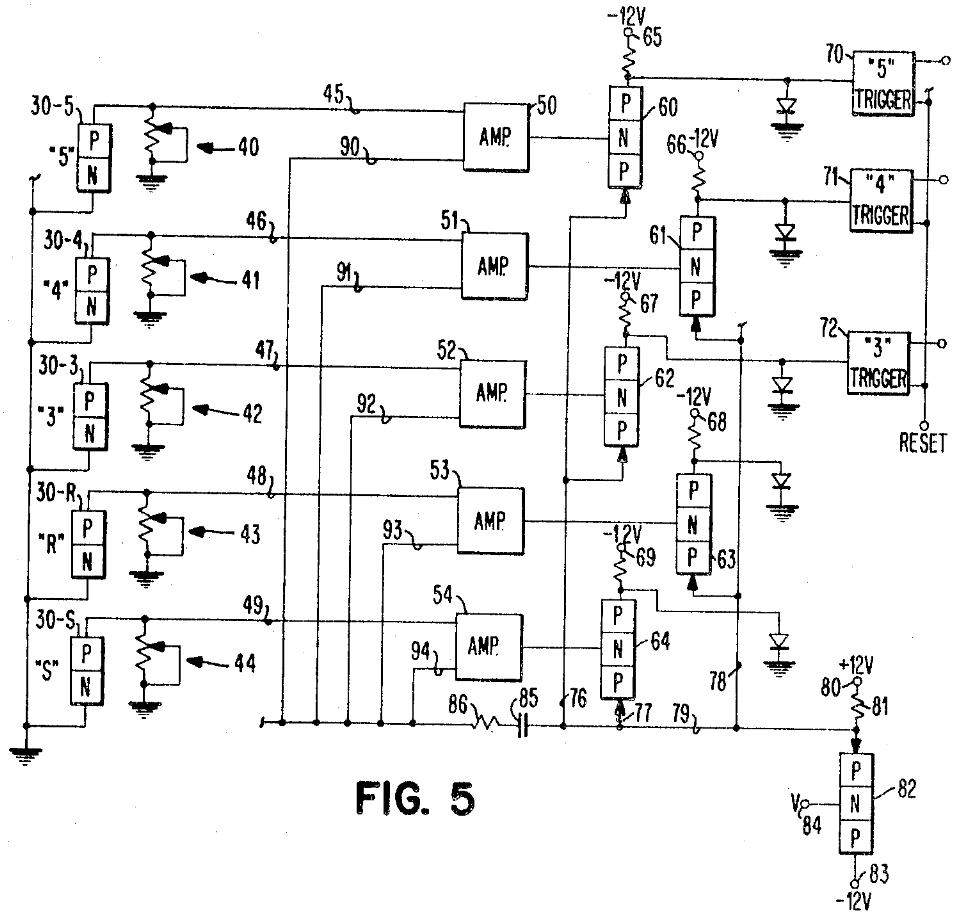
FIGURE 5 is a schematic electrical diagram of the identification circuits and the registration control circuits of the invention.
Figure 6:
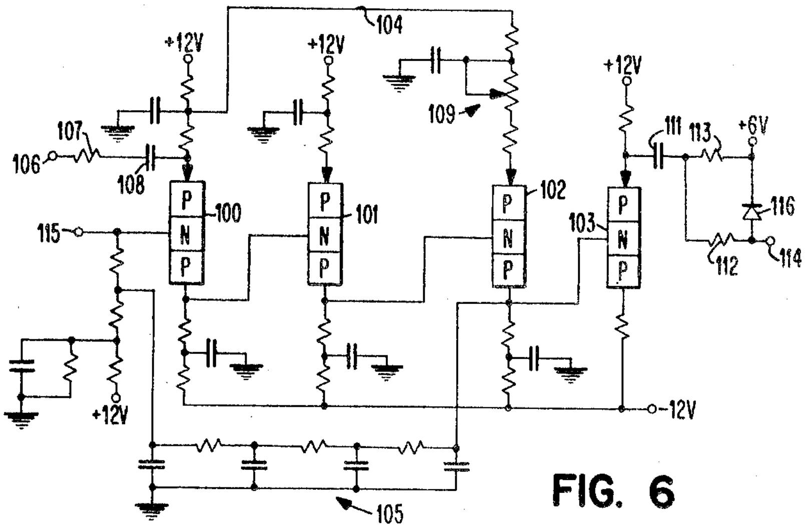
FIGURE 6 is an electrical schematic diagram of an amplifier which may be used in the circuit shown in FIG. 5.

In FIG. 6, there is illustrated one example of an amplifier which may be used with the circuit of FIG. 5. However, it is to be understood that the identification circuit is not restricted to the particular amplifier illustrated. The amplifier comprises transistors 100, 101 and 102 forming three amplification stages, and transistor 103 providing an emitter follower output stage. To reduce instability within the amplifier due to temperature variation, negative feedback is supplied on line 104 between the emitter of the first stage transistor 100 and the emitter of the third stage transistor 102; also, the base of the first stage is coupled through a smoothing network generally denoted 105 which is connected to the collector of the third stage transistor. The emitters and collectors of each amplification stage and the base of the first stage are connected to ground through suitable decoupling capacitors. Amplifier gain is controlled by variable resistor 109 in the emitter circuit of the last amplification stage.

In operation, a solar cell input signal is supplied to the emitter of the first stage transistor 100 at terminal 106 across resistor 107 and capacitor 108. Feedback signals across capacitor 85 and resistor 86 on line 79 of FIG. 5 are supplied directly to the base of first stage transistor 100. All transistors 100–103 are biased for conduction in the absence of an input signal at terminal 106 to provide class A amplification. When a negative pulse appears at terminal 106, transistor 100 tends toward cutoff driving transistor 101 further into conduction. This action results in driving transistor 102 toward cutoff which drives the base of the emitter follower 103 more negative creating a relatively heavy current conduction across its emitter resistor to produce a negative voltage change at the emitter output. This change appears across capacitor 111 and resistors 112 and 113 at terminal 114 to be used as an input to the base of one of the switching transistors 60–64.

The operation of the identification apparatus will now be described with reference to FIGS. 5 and 6. The case first to be assumed is that when no images appear on any of the masks of mask member 26 so that solar cells 30–5, 30–4, 30–3, 30–R and 30–S will each be producing signals of varying levels because of the quantity of light reaching the cells through the transparent areas of the respective masks. In this situation there is essentially a steady state conduction so that amplifiers 50–54 see no A.C. signal and the base electrodes of transistors 60–64 are clamped by suitable diodes such as diode 116 of FIG. 6 connected to a potential which is more positive than that of the emitters as controlled by the current flow through resistor 81 by transistor 82. For example, the base electrodes of the switching transistors may be clamped at +6 volts while the emitter of transistor 82 may be at substantially +4 volts. Hence, with no transistor 60–64 conducting, no output signals will exist to switch on any trigger 70–72.

When images are now projected onto the image masks, the solar cells will be cut off from some of the light and produce negative pulses on their respective supply lines to their amplifiers. It will be recalled that the R mask, having a larger transparent area and being displaced upwardly, will be the first mask to encounter any image and also will encounter more of the projected image than any of the other masks as the images start to move downwardly across the masks. Although the R mask will produce the largest negative pulse, each of the other masks will encounter some portion of the image and also produce negative pulses. These pulses will be supplied on respective lines 45–49 to respective amplifiers 50–54 at terminals 106 thereof. Thus, each amplifier will produce negative pulses at the base of its respective switching transistor. Generally for a transistor 60–64 to turn on, the base must be approximately 0.2 volt more negative than the emitter with PNP transistors as shown. Some of the pulses will be insufficient to switch on a respective transistor but some of the transistors will start to turn on and require a heavier current load across resistor 81 which lowers the voltage on line 79 decreasing the emitter voltages and producing a negative voltage change across capacitor 85 and resistor 86. Identical portions of this negative voltage deflection appear in parallel on lines 90–94 at the respective terminals 115 of each amplifier. The negative going signal on terminal 115 tends to reduce the effect of the negative pulse at terminal 106 across capacitor 108 by maintaining the original base-emitter voltage differential present during the steady state conduction of transistor 100. The application of this feedback signal to each solar cell amplifier thus increases the percentage difference between the channel having the largest signal and the channels having the lesser signals with the end result that only a single switching transistor may be completely turned on at any particular instant. As the projected images continue to move downwardly across the R mask, its transistor 63 will be turned on first and will establish a voltage level on line 79 which must be exceeded by a more negative base signal before any other transistor will be turned on.

As will be recalled from the description of FIGS. 2*a*–2*c* and 3, at optimum registration of the 5 image with the 5 mask, the projected image on the R mask was partially off the transparent area of the latter mask. Thus, the R signal on line 48 of FIG. 5 experiences a positive going change tending to reduce the conduction of transistor 63 and slightly altering all emitter voltages by decreasing the emitter current required. As the 5 image comes into full registration with its correct image mask, a solar cell behind that mask will produce the largest negative pulse which is supplied on line 45 to amplifier 50 so that transistor 60 will be turned on. At this time the voltage on line 79 will experience another decrease and pull the emitter of the R transistor 63 further negative while simultaneously supplying a negative change to the R amplifier 53, with the result that the base of transistor 63 will go more positive and switch the transistor off. The 5 transistor 60 is now the only switching transistor conducting and therefore a positive signal will appear across its collector resistor which will turn its indicator trigger 70 on to supply a signal level to a utilization device.

As the image moves from the 5 mask it comes into full registration on the S mask causing the solar cell 30–S to produce the most negative pulse on line 49 at amplifier 54. It will be recalled that as the 5 image left the 5 mask a positive voltage change was detected on line 45 and at amplifier 50 so that the current through switching transistor 60 is decreased raising slightly the voltage on line 79. However, since the S mask now contains the most image, the signal from its amplifier 54 is sufficient to turn transistor 64 on. As the projected images continue to move downward, solar cell signals will all tend to become more positive and eventually will cause their respective signals at the bases of the switching transistors to become more positive than the emitter voltage determined by transistor 82. All transistors will then be cut off until the next mirror surface 14 projects a new set of images onto each image and registration mask.

From the foregoing circuit description it will be observed that the solar cell outputs from all image and registration channels are constantly compared as to amplitude when images appear on their respective masks, and that the channel having the most negative signal thereon will cause a switching transistor 60–64 to be turned on. As soon as one of the transistors in an image channel is turned on its respective indicating trigger 70–72 will also be turned on and indicate the particular mask with which a projected image most closely coincided. However, control is exercised over the image channels by the R and S registration channels to prevent image identification at any time except when projected images are optimumly registered with the image masks. The R and S channels thus provide a means for timing the identification of the projected image and also provide minimum signal levels which must be exceeded by an image channel before identification can take place.

No reset circuit for the indicator triggers 70–72 has been shown because such a circuit is considered well within the ability of one skilled in the electrical art. As an example, however, all trigger output terminals may be commonly connected to an OR circuit which is connected to a monostable multivibrator or single shot that is, in turn, connected to the trigger reset terminals. When an indicator trigger is activated it turns on the single shot which produces a pulse of predetermined duration as desired and the trailing edge of the pulse may be applied as a common reset pulse for all triggers.

Figure 7:
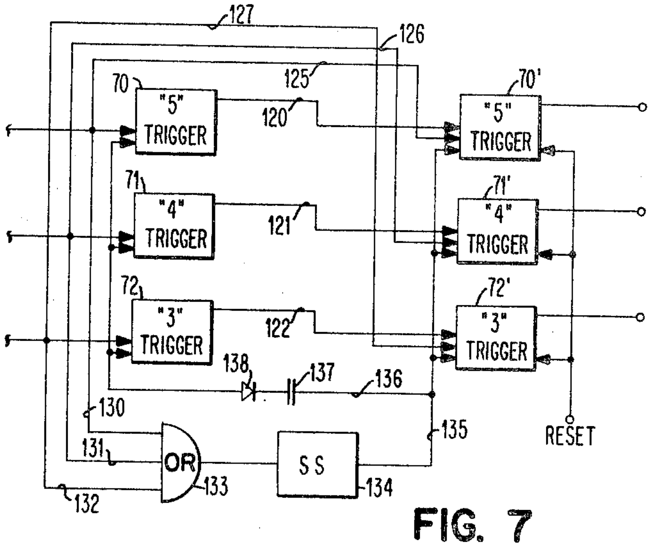
FIGURE 7 is a schematic diagram of an alternative indicator circuit shown in FIG. 5.

During the recognition of indicia which has been recorded by tabulating machines, there are encountered at times indicia which are of uneven density or portions of the indicia may be missing because of improperly aligned printing members. In this instance, erroneous recognition of an indicium may occur, resulting in poor reliability. Recognition accuracy may be improved by modifying the indicator circuits described above with reference to FIG. 5. Such modification is shown in FIG. 7. Instead of providing a single set of indicating triggers 70–72 there are provided a double set of indicating triggers 70, 71, 72 and 70′, 71′, 72′ arranged such that recognition of an indicium is required on two successive scans of an image across the same image channel before the output trigger is turned on.

This is accomplished by using the output signal from one of the triggers 70–72 as a conditioning or gating signal to a respective one of the second set of triggers 70′–72′ on lines 120, 121, 122. A second input to the triggers of the second set 70′–72′ is provided from the respective output lines from transistors 60–62 on lines 125, 126, 127. Each of these switching transistor output lines is also connected by lines 130, 131, 132 to an OR circuit 133 which is connected to a single shot multivibrator 134. The output from the single shot is also supplied as a gating signal and third input signal on line 135 to each of the second set of triggers 70′–72′. Thus, when one of the switching transistors 60–62 is turned on its output is supplied to its corresponding trigger 70–72, to one input to a corresponding trigger 70′–72′ in the second set, and to OR circuit 133 which will turn on single shot 134. The single shot is on for a predetermined time interval slightly longer than the time required for an additional image scan to occur. Since the switching transistor output first turns on a trigger in the first set 70–72, no gating signal to the corresponding second trigger is present on lines 120–122 when the transistor pulse appears at the second set 70′–72′ on lines 125–127. Therefore, only one of the triggers 70–72 will be turned on. The start of the single shot output is delayed longer than the duration of the switching transistor signal so that one of the triggers 70′–72′ will not be turned on prematurely.

During the next succeeding scan of the images across the masks and if the same image channel is energized, its switching transistor 60–62 will provide a second pulse which will have no effect on its first indicating trigger 70–72, already on, but will appear at the corresponding trigger in the second set which is gated by the single shot and the output of the trigger that is on in the first set so that the corresponding one of the second triggers is switched on. The single shot is timed to produce an output pulse of predetermined duration so that, if the same image channel does not produce an output signal on the next succeeding scan, the single shot gate pulse will have expired from the second set of triggers thus blocking any further switching of that set of triggers. In this circuit the end of the single shot pulse is also supplied on line 136 through capacitor 137 and diode 138 to each of the first set of triggers 70–72 as a reset pulse for any trigger 70–72 which was turned on by the recognition pulse from transistor 60–62. The result of the circuit of FIG. 7 is that a second trigger will be turned on and will supply an output only when recognition has occurred on a particular image channel during two successive scans of the images across its mask. The reset of auxiliary triggers 70′–72′ may be accomplished as described above for triggers 70–72 of FIG. 5 when only a single set of triggers is used.

Figure 8:
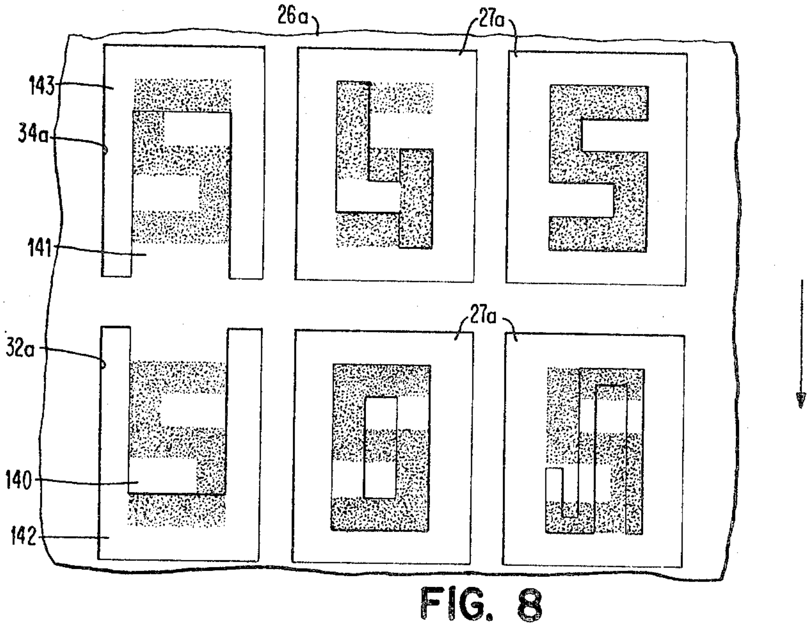
FIGURE 8 is a partial view of an alternative positive mask member which may be used with the invention shown in FIG. 1.

The invention up to this point has been described as employing negative image masks to accomplish identification. Positive masks may, however, be used by slightly modifying the registration masks and identification circuits. When positive image masks **27*a*** are employed, the image portions of the masks, as shown in FIG. 8, are opaque and the mask background areas are transparent. The photo-electric transducer behind each mask must be sufficiently large to cover the entire transparent area of its respective mask.

Instead of searching for the most negative transducer output voltage change, as in the first embodiment, the mask transducer producing the most positive change is sought. Therefore, the R and S masks **32*a* and 34*a*, approximately 20–25% narrower than the image masks to insure sufficient control signals, are provided with opaque areas 140 and 141, respectively, which are positioned within the registration masks so that the downwardly moving images will fall entirely thereon immediately prior to and immediately subsequent to optimum registration. At the time of optimum registration between images, such as the 5 image shown, and image masks 27*a*, a portion of the 5 images will fall on the transparent areas 142 and 143** while only the 5 mask will have no projected image falling on its transparent area.

Figure 9:
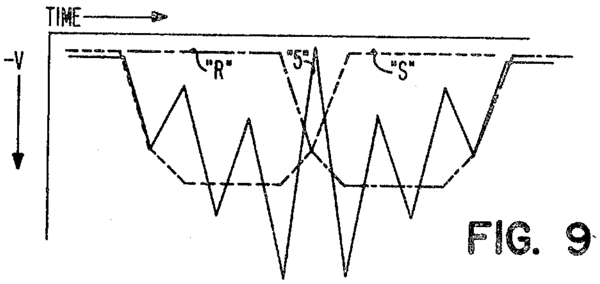
FIGURE 9 is a graphical representation of the voltage signals encountered at the photoelectric transducers of FIG. 1 when the image of a 5 is moved across the positive mask member shown in FIG. 8.

The output voltages from the R, S and 5 transducers as the images move downwardly, in the direction of the arrow, across the positive masks are illustrated in FIG. 9. These output voltages are merely approximated at the time of optimum horizontal alignment between images and masks. Before an image falls on any mask, each transducer is producing a steady output voltage, with no change, at a voltage level corresponding to a quantity of its transparent area which is illuminated. At this time the nonreflective, opaque area of the shield limits the light striking the masks with the result that the 5 channel produces an output level below the output levels of the R and S channels. Because the 5 mask has more transparent area than the registration masks, its transducer is more significantly affected by the limited light than the registration transducers.

As the images begin to move downwardly across the upper portions of the masks in union, the transducer outputs for the S and 5 masks decrease due to less light falling thereon. However, the image on the R mask falls on the opaque area 140 so that its transducer output does not change appreciably. At a time just prior to the optimum registration shown, the image on the R mask starts to fall on transparent area 142 below opaque area 140 so that the R output goes more negative. During the same time, a portion of the image on the S mask is still on transparent area 143 above opaque area 141 so that the S signal remains relatively negative. As shown, when optimum registration occurs between the 5 image and 5 mask, no image falls on its transparent area and the 5 signal rapidly becomes more positive, exceeding the R and S signal changes so that these latter signals no longer block identification as described with reference to FIG. 5 heretofore.

The S output subsequently changes, going the most positive after its image passes entirely onto opaque area 141. When this occurs, the S output is sufficient for the registration circuits to regain control of the identification circuits of FIG. 5. It will be noted that the image on the R and 5 mask transparent areas will hold their outputs down until the images pass directly therefrom.

Since the most positive voltage changes are sought when positive masks are used, the circuit in FIG. 5 must be modified accordingly. Such modification includes changing the PNP type switching transistors 60–64 to NPN type and changing threshold PNP transistor 82 to an NPN type. The output indicating triggers 70–72 are also appropriately adapted to be turned on by negative signals from the switching transistors.

Although the invention has been described primarily for use with a continuously moving record, it may also be used to recognize stationary indicia such as would be encountered when a record is fed incrementally along its path. When the apparatus is employed in this manner, it is preferably that the plane of each succeeding reflecting surface 14 of mirror 13 be disposed at a successively greater angle relative to the rotational axis of the mirror. This permits the successive images of the stationary indicium to be projected in slightly different vertical paths across the masks. The successive scan displacement of the projected images is desirable decause the recorded indicium may not be correctly centered within its allotted character area. If, however, the recorded indicia are accurately printed the apparatus may be used as described without alteration of the mirror surfaces.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for determining by its image the identity of a recorded indicium belonging to a group of indicia, each having a unique image, comprising, in combination:
- mask means including an image mask of each of said indicia;
- means for moving an entire image of said indicium across each said mask;
- identification means associated with each said mask for identifying the mask with which the said image thereon coincides; and
- a pair of registration means connected to said identification means for overriding said identification means during the movement of said images on the masks both before and after the interval when said moving images are optimumly registered with said masks.

2. Apparatus for determining by its image the identity of a recorded indicium belonging to a group of indicia, each having a unique image, comprising, in combination:
- mask means including an image mask of each of said indicia;
- means for projecting an image of said indicium onto each said mask;
- means including said projecting means for varying the registration of said projected images relative to said masks;
- first and second control means for defining an interval of optimum registration when said images are on said masks; and
- identification means operable during said interval for comparing the degree of coincidence between each said mask and the image projected thereon and providing an output signal representative of that mask with which said image thereon most closely coincides.

3. Apparatus for determining by its image the identity of a recorded indicium belonging to a group of indicia, each having a unique image, comprising, in combination:

mask means including an image mask of each of said indicia;
means for simultaneously projecting an image of said indicium onto each said mask;
means including said projecting means for varying the registration of said projected images relative to said masks;
first and second control means sensing said varying registration for defining a period of optimum registration of said images with said masks; and
identification means rendered operable during said period for comparing the degree of coincidence between each said mask and the image projected thereon and providing an identity signal of that mask having the best degree of coincidence.

4. Apparatus for determining by its image the identity of a recorded indicium belonging to a limited group of indicia, each having a unique image, comprising, in combination:
mask means including an image mask of each of said indicia and a registration mask;
means for simultaneously projecting a plurality of entire images of said indicium onto said mask means;
scanning means including said projecting means for advancing each of said projected images across one of said masks and said registration mask;
means comparing the degree of coincidence between each said image mask and the image moved thereacross and operable to indicate that mask which an image coincides; and
registration means including said registration mask and operable to override said comparing means until said images are optimumly registered with said masks during said advance.

5. Apparatus for determining by its image the identity of a recorded indicium belonging to a predetermined group of indicia, each having a unique image, comprising:
mask means including an image mask of each of said indicia of said group;
means for producing multiple images of said recorded indicium, each corresponding to one of said masks;
scanning means including said multiple image means for moving each of said multiple images through a position of optimum registration with its said corresponding mask;
means for comparing the degree of coincidence between each said mask and the image moving thereacross and operable to provide an identity signal of that mask most closely coinciding with its said image; and
first and second control means connected to said comparing means for respectively preventing operation of said comparing means when said images are on the masks except during the interval when said images are optimumly registered with said masks.

6. Apparatus for determining by its image the identity of a recorded indicium belonging to a predetermined group of indicia, each having a unique image, comprising:
mask means including the image mask of each of said group of indicia and a first and second registration mask;
scanning means for moving an entire image of said indicium simultaneously across each of said masks through a position of optimum registration therewith and across said registration masks;
identification means comparing the degree of coincidence between each said mask and the image moving thereacross operable to generate an indication of the mask-image combination having best degree of coincidence; and
first and second control means each including a respective registration mask and connected with said identification means, being effective at other than the position of said optimum registration for preventing the production of said indication.

7. Apparatus for determining by its image the identity of a recorded indicium belonging to a predetermined group of indicia, each having a unique image, comprising:
mask means including an image mask of each of said indicia and a plurality of registration masks;
optical means for moving an image of said recorded indicia across each of said image and registration masks in unison;
comparing means related to each said image mask for producing signals of amplitude in proportion to the degree of coincidence between each said image mask and the image moving thereacross;
switching means connected to said comparing means and having an activatable output means corresponding to each of said image masks, said switching means being responsive to the one of said signals having the greatest amplitude for activating the corresponding output means; and
registration means including said registration masks and responsive to the quantity of image thereon for overriding said switching means except when said images are in optimum registration with said image masks.

8. Apparatus for determining by its image the identity of an unknown recorded indicium belonging to a limited group of indicia, each having a unique image, comprising:
a mask member including an image mask of each of the indicia in said group commonly aligned, and a pair of registration masks each disposed in opposite directions from alignment with said image masks;
image multiplying means for simultaneously moving an image of said indicium across said image and registration masks in common alignment so as to pass through a position of optimum registration with first one of said registration masks, then said image masks, and finally the other of said registration masks;
a photoelectric transducer for each of said image and registration masks adapted to provide an electrical output signal of amplitude proportional to the quantity of image projected onto its said mask;
an indicating means corresponding with each of said image masks operable to produce an output indication unique to its said mask;
comparing means responsive to the image mask transducer providing largest output signal for activating the said indicating means corresponding to that said image mask; and
control means associated with said comparing means and responsive to the output signals from said registration mask transducers during optimum registration of images with said registration masks for overriding said comparing means.

9. Apparatus as described in claim 8 wherein each said image mask is a negative mask having a transparent area on an opaque background of size and configuration to match the image of a different one of said indicia, and said registration masks are each transparent with a plurality of uniform opaque areas thereon in a predetermined pattern.

10. Apparatus as described in claim 8 wherein each said image mask is a positive mask having an opaque area on a transparent background, said opaque area being of size and configuration to match a different one of said indicia.

11. Apparatus as described in claim 8 wherein said comparing means includes a plurality of transistors each having base, emitter and collector electrodes with said base electrodes adapted to receive a different one of said image transducer output signals, said emitter electrodes being connected in common to a variable supply potential and said collector electrodes being connected to a different one of said indicating means.

12. Apparatus for determining by its image the identity of a recorded indicium belonging to a predetermined group of indicia, each having a unique image, comprising:
mask means including an image mask of each of the indicia in said group and a pair of registration masks;

scanning means for moving an image of said indicium across each of said image and registration masks in unison so that an image of said indicium achieves maximum coincidence with one of said registration masks prior and with the other registration mask subsequent to optimum registration of said images and said image masks;

means responsive to the degree of coincidence between each said image mask and the image moving thereacross for producing an output signal corresponding to each said image mask of amplitude proportionate to the degree of coincidence between each image mask and the image thereon;

indicating means for each of said image masks selection means responsive to the output signal of greatest amplitude for activating that one of said indicating means with which said output signal corresponds; and control means responsive to the coincidence between said registration masks and the images thereon for overriding said selection means except during said optimum registration between said image masks and said images thereon.

13. Apparatus for determining by its image the identity of a recorded indicium belonging to a limited group of indicia, each having a unique image, comprising, in combination:

image means for producing simultaneously a plurality of images of said recorded indicium, including a pair of registration images of said indicium;

scanning means including said image means for moving each of said plurality of images and registration images in unison along a predetermined optical path;

mask means including an image mask of each of the indicia of said group, said image masks being arranged so that one of said plurality of images passes across each of said image mask simultaneously;

a pair of registration masks disposed in the path of said moving registration images so that said registration images move into optimum coincidence with one of said registration masks prior and with the other registration mask subsequent to optimum coincidence between said image masks and said moving images;

an activatable indicating means for each of said image masks;

means operable to compare the degree of coincidence between an image mask and the image moving thereacross for providing an activating signal to one of said indicating means corresponding to that said image mask most closely coinciding with the image moving thereacross; and control means sensing the coincidence between said registration masks and said registration images for preventing operation of said comparing means except during optimum coincidence between said image masks and said images.

References Cited by the Examiner

UNITED STATES PATENTS

| | | | |
|---|---|---|---|
| 2,795,705 | 6/1957 | Rabinow | 250—219 |
| 2,933,246 | 4/1960 | Rabinow | 235—61.11 |
| 3,064,519 | 11/1962 | Shelton | 340—146.3 |
| 3,098,162 | 7/1963 | Fischman | 308—88.5 |
| 3,104,369 | 9/1963 | Rabinow | 340—146.3 |
| 3,167,744 | 1/1965 | Rabinow | 340—146.3 |
| 3,196,394 | 7/1965 | Horwitz et al. | 340—146.3 |

MAYNARD R. WILBUR, *Primary Examiner.*

MALCOLM A. MORRISON, *Examiner.*

J. S. IANDIORIO, J. E. SMITH, *Assistant Examiners.*